UNITED STATES PATENT OFFICE.

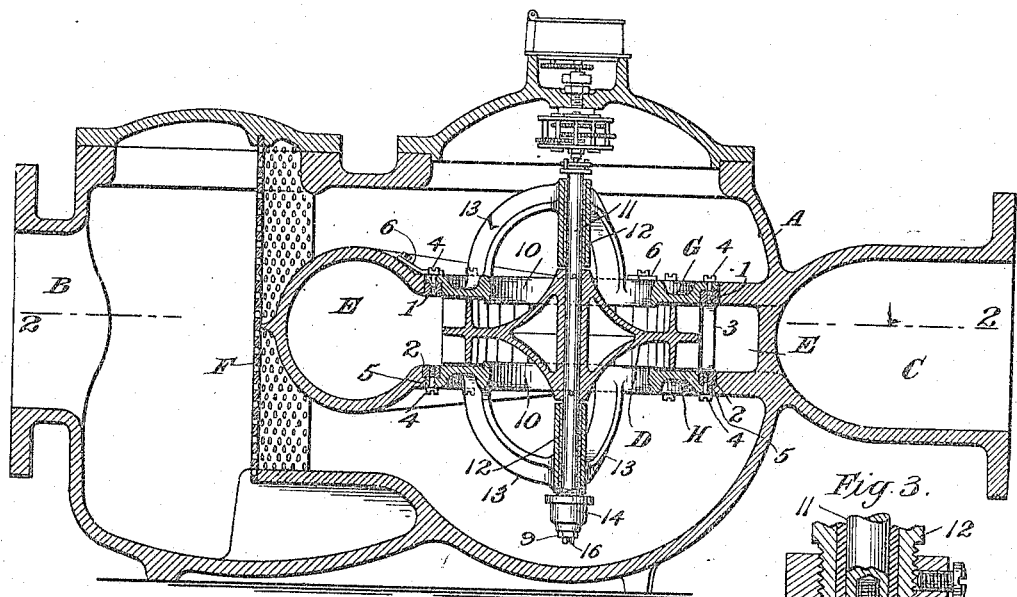
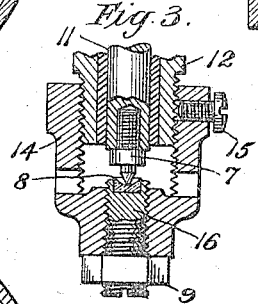
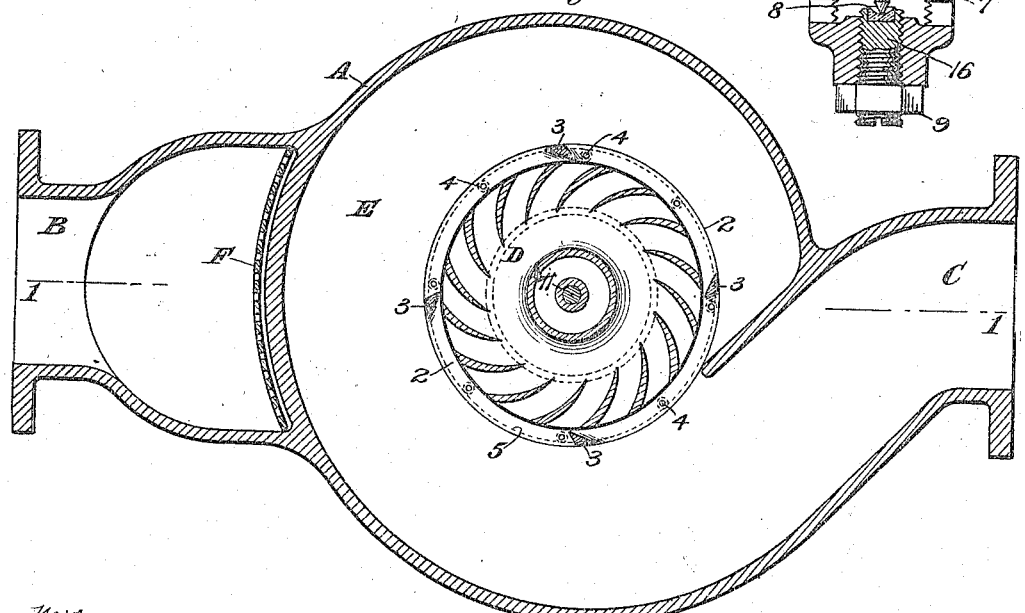

JOSEPH W. SIMS, OF EAST ORANGE, NEW JERSEY, ASSIGNOR TO HENRY R. WORTHINGTON, OF NEW YORK, N. Y., A CORPORATION OF NEW JERSEY.

ROTARY METER.

1,133,408.

Specification of Letters Patent.

Patented Mar. 30, 1915.

Application filed December 6, 1909. Serial No. 531,502.

*To all whom it may concern:*

Be it known that I, JOSEPH W. SIMS, a citizen of the United States, residing at East Orange, county of Essex, and State of New Jersey, have invented certain new and useful Improvements in Rotary Meters, fully described and represented in the following specification and the accompanying drawings, forming a part of the same.

This invention relates to liquid meters of that class known as turbine meters in which the liquid acts to rotate a vane wheel, the especial objects of the invention being to provide an improved construction by which the accurate and convenient assembling of the parts is secured, and to provide an improved step bearing for the meter shaft.

In the accompanying drawings, forming a part of this specification, there is shown a construction embodying the invention in a preferred form and this construction will now be described and the features forming the invention then specifically pointed out in the claims.

In the drawings:—Figure 1 is a vertical section of the device on the line 1 of Fig. 2. Fig. 2 is a horizontal section on the line 2 of Fig. 1. Fig. 3 is a detail section of the step bearing.

Referring to the drawings, A is the meter casing, B the inlet, C the outlet, and D the meter wheel surrounded by the central delivery volute E terminating in outlet C. The liquid passes to the wheel from casing A through inlets 10 above and below the wheel, and to casing A from inlet B above and below the volute E through vertical strainer F. The meter wheel D is fixed on shaft 11 which operates the counter through registering mechanism of any suitable form. The shaft 11 is mounted in bearings 12 carried by arms 13 on the top and bottom plates G, H which form the opposite walls of the wheel chamber and through which are the central inlet openings 10. These top and bottom plates G, H, with the shaft 11, bearings 12 and arms 13 are united to form a single structure as follows:—The plates G, H are secured together by a sleeve open on the side for the free passage of the liquid. In the form shown, the plates G, H are recessed at their outer edges to receive rings 1, 2 which are united by standards 3 so as to form the connecting sleeve, the liquid passing freely from the wheel D between posts 3 which are preferably shaped so as to interfere with the flow as little as possible. The plates G, H, are secured to the rings 1, 2 by screws 4, the wheel D with its shaft 11 first being put in place in one plate and bearing 12, and the other plate and bearing 12 then being slipped over the shaft and the plates and connecting sleeve then secured together. The walls of the volute E are cut out to receive the plates G, H with the wheel D, and the bottom wall of the volute is formed with a shoulder 5 on which rests the bottom ring 2, thus supporting the wheel and wheel chamber. It will be seen that the meter wheel D with its chamber plates G, H, shaft 11, bearings 12 and arms 13 are thus united into a single structure by the rings 1, 2 and posts 3, which structure is simply dropped into place in the volute and may be removed without disturbing any of the adjustments, thus assuring the accurate positioning of the parts while giving ready access to the interior of the volute, and providing for convenient assembling and disassembling of the parts. The wheel and its connected parts may be withdrawn from the casing A by removing the top cap which carries the registering mechanism. The meter wheel and its connected parts may be held in place in the volute only by their own weight, but it may be found desirable to hold them down in place, and for this purpose screw held plates 6 or other suitable means may be used.

The lower end of the bottom bearing sleeve 12 is screw threaded on its outer side to receive an adjustable thrust bearing block 14 which is locked in place after adjustment by set screw 15. The wheel shaft 12 is tapped at its lower end to receive a metal bearing piece 7, the lower conical end of which rests in a concave bearing piece 8, this bearing piece 8 being carried by a screw block 16 screwed into the end of the thrust bearing piece 14, the bearing piece 8 thus being adjustable vertically and the block 16 being locked in its adjusted position by lock nut 9. The bearing pieces 7, 8 are of different metals or suitable material, the piece 7 or its bearing point preferably being of phosphor bronze or Monel metal, and the bearing piece 8 of sapphire. This construction provides a very efficient, durable and convenient step bearing for meter shafts, in which adjustment to secure the proper running conditions is readily and accurately made and such adjustment maintained, while the parts are readily removable for examination and replacement.

What I claim is—

1. In a meter, the combination, with a meter casing separated into two independent compartments by the upper and lower walls of an intermediate discharge chamber, said casing having an inlet leading to both compartments and an outlet leading from the intermediate discharge chamber, the said walls of the discharge chamber having central openings, of a radial discharge meter vane wheel having a centrally arranged deflecting web arranged to receive fluid from opposite directions and discharge it through the vanes, a pair of rings concentric with the vane wheel, means for connecting said rings, side plates having inlet openings connected to said rings and arranged one at each side of said wheel, a shaft on which the vane wheel is mounted, brackets connected to said side plates, and journals carried by the brackets, said wheel, rings, side plates, brackets and journals being connected to form one structure removably mounted in the central openings in the walls of the discharge chamber.

2. In a fluid meter, the combination, with a meter casing separated into two independent compartments by the upper and lower walls of an intermediate discharge chamber, said casing having an inlet leading to both compartments, and having an outlet leading from the intermediate discharge chamber, the said walls of the intermediate discharge chamber having central openings, of a radial flow vane wheel having a centrally arranged deflecting web arranged to receive fluid from opposite directions parallel to the wheel axis and to discharge it radially through the vanes of the wheel, and means for mounting said wheel between the walls of the discharge chamber, with its axis in line with the axes of said central openings in said walls.

3. In a fluid meter, the combination, with a meter casing separated into two independent compartments by the upper and lower walls of an intermediate discharge chamber, said casing having an inlet leading to both compartments, and having an outlet leading from the intermediate discharge chamber, the said walls of the intermediate discharge chamber having central openings, of a radial flow vane wheel having a centrally arranged deflecting web arranged to receive fluid from opposite directions parallel to the wheel axis and to discharge it radially through the vanes of the wheel, side plates inclosing the wheel on opposite sides and carrying shaft bearings, and means for detachably securing said side plates together to form a single structure including the wheel and shaft, wheel chamber and shaft bearings, and open about the periphery of the wheel to permit the free passage of fluid, said single structure being secured in the casing with the wheel between the walls of the discharge chamber and with the axis of the wheel in line with the axes of the said central openings in said walls.

4. In a fluid meter, the combination, with a meter casing separated into two independent compartments by the upper and lower walls of an intermediate discharge chamber, said casing having an inlet leading to both compartments, and having an outlet leading from the intermediate discharge chamber, the said walls of the intermediate discharge chamber having central openings, of a radial flow vane wheel having a centrally arranged deflecting web arranged to receive fluid from opposite directions parallel to the wheel axis and to discharge it radially through the vanes of the wheel, side plates inclosing the wheel on opposite sides and carrying shaft bearings and a sleeve for detachably securing said side plates together to form a single structure including the wheel and shaft, wheel chamber and shaft bearings, and open about the periphery of the wheel to permit the free passage of fluid, said single structure being secured in the casing with the wheel between the walls of the discharge chamber and with the axis of the wheel in line with the axes of the said central openings in said walls.

5. In a fluid meter, the combination, with a meter casing separated into two independent compartments by the upper and lower walls of an intermediate discharge chamber, said casing having an inlet leading to both compartments, and having an outlet leading from the intermediate discharge chamber, the said walls of the intermediate discharge chamber having central openings, of a radial flow vane wheel having a centrally arranged deflecting web arranged to receive fluid from opposite directions parallel to the wheel axis and to discharge it radially through the vanes of the wheel, a shaft on which said wheel is fixed, plates on opposite sides of the wheel inclosing the wheel and forming a wheel chamber, shaft bearings carried by said plates, in which bearings the wheel shaft is mounted, a sleeve detachably connecting the plates to form a single structure and open on the periphery to permit the free passage of liquid through the sleeve, said single structure being secured in the casing with the wheel between the walls of the discharge chamber and with the axis of the wheel in line with the axes of the said central openings in said walls.

6. In a fluid meter, the combination, with a volute chamber having its spiral locus in a substantially horizontal plane, and having its upper and lower walls provided with central openings, the lower wall having a flanged edge around its central opening, a casing surrounding the volute chamber and divided into upper and lower inlet chambers by the volute walls, said casing also having an outlet chamber into which the volute chamber discharges, and also having an inlet chamber in communication with both the upper and lower inlet chambers, of a screen located at the entrance to said upper and lower inlet, a pair of side plates having their edges rabbeted, said side plates fitting the central openings in the walls of the volute chamber, the lower side plate resting on the flange of the lower opening, rings fitting in the rabbets of the side plates, and connections between the rings whereby the latter and the plates are secured together.

7. The combination with the volute E, radial discharge vane wheel D and wheel shaft 11, of side plates G, H, inclosing the wheel and having inlet openings 10 and carrying shaft bearings 12, and rings 1, 2 and connections between them by which the plates G, H are secured together, said volute E being formed to receive and support the connected plates.

8. The combination with the volute E having a seat 5, radial discharge vane wheel D and wheel shaft 11, of side plates G, H inclosing the wheel and having inlet openings 10 and carrying shaft bearings 12, and rings 1, 2 and connections between them by which the plates G, H are secured together, said volute E being formed to receive the connected plates and support them on seat 5, and a step bearing for the wheel shaft below bearing 12 and carried by the bottom plate.

9. The combination with the volute E, radial discharge vane wheel D and wheel shaft 11, of side plates G, H, inclosing the wheel and having inlet openings 10 and carrying shaft bearings 12, and rings 1, 2 and connections between them by which the plates G, H are secured together, said volute E being formed to receive and support the connected plates, and a step bearing for the wheel shaft consisting of the adjustable screw thrust bearing block 14 on the end of one of the sleeves 12, the bearing piece 7 inserted in the end of the shaft, and the adjustable screw block in the outer end of block 14 carrying bearing piece 8, said screw thrust bearing block 14 being adjustable from the exterior of the wheel structure.

In testimony whereof, I have hereunto set my hand, in the presence of two subscribing witnesses.

JOSEPH W. SIMS.

Witnesses:
   J. A. GRAVES,
   C. J. SAWYER.